May 4, 1926.
E. MARQUART
1,583,409
DEVICE FOR USE IN SETTING POLES
Filed Oct. 13, 1925
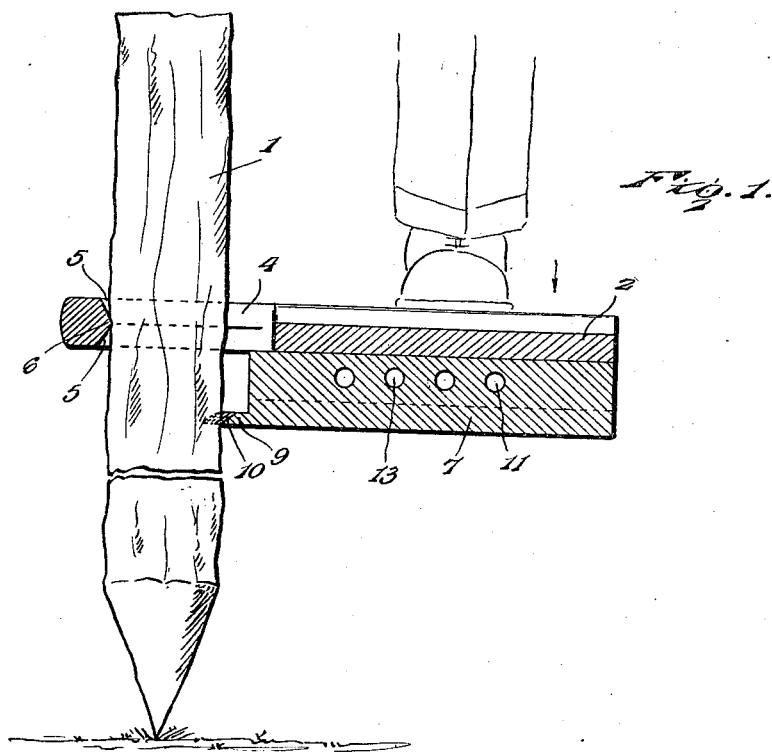
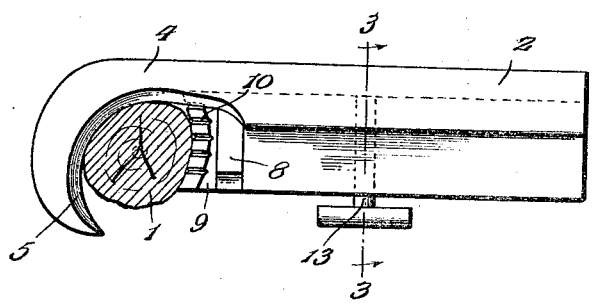
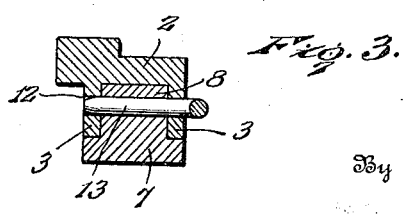
Inventor
E. Marquart.
By
                  , Attorney Patented May 4, 1926.

1,583,409

UNITED STATES PATENT OFFICE.

ERNST MARQUART, OF NEWARK, OHIO.

DEVICE FOR USE IN SETTING POLES.

Application filed October 13, 1925. Serial No. 62,316.

*To all whom it may concern:*

Be it known that I, ERNST MARQUART, a citizen of the United States, residing at Newark, in the county of Licking and State of Ohio, have invented certain new and useful Improvements in Devices for Use in Setting Poles, of which the following is a specification.

This invention is a tool for use by farmers and gardeners in setting young trees, poles, or the like. The object of the invention is to provide a simple tool by which the labor incident to setting out young plants or the placing of bean poles, for instance, will be very materially reduced and expedited, so that the work may be completed more rapidly and with less fatigue than has heretofore been the case. A secondary object of the invention is to provide a tool which may be easily adjusted to the diameter of the pole or plant with which it is to be engaged, and other objects of the invention will appear incidentally in the course of the following description. One embodiment of the invention is illustrated in the accompanying drawing, and the invention resides in certain novel features which will be particularly pointed out in the appended claims.

In the drawing:

Fig. 1 is a view showing my improved tool in longitudinal vertical section and illustrating the manner of using the same.

Fig. 2 is a plan view of the tool.

Fig. 3 is a detail section on the line 3—3 of Fig. 2.

In the drawing, the reference numeral 1 indicates a pole which is to be set in the ground in proper position to support vines or like plants. This pole, of course, has a tapered lower end so that it may readily penetrate the ground, but according to present practices it is necessary to dig a hole of some size in order to set the pole and then fill the hole around the pole. My invention provides a tool adapted to engage the pole so that pressure applied to the tool will cause the pole or plant to enter the ground quickly and to a sufficient depth to be securely held. The tool includes a main body 2 which is provided on its under side with longitudinal ribs or flanges 3 and at one end is extended and bent laterally so as to define a hook or anchoring member 4 which is adapted to partly encircle the pole, as clearly shown in Fig. 2. The inner arcuate side of the hook is preferably tapered to its medial plane from its opposite parallel faces, as shown at 5, whereby a central ridge 6 is produced, adapted to partly embed itself in the side of the pole and thereby firmly anchor the body to the pole. The tool also includes a gripping or clamping member 7 which is preferably a substantially oblong bar having its side portions reduced whereby to form a central rib 8 of proper dimensions to fit snugly but slidably between the flanges 3 of the body 2, as shown in Fig. 3. At one end, a transverse arcuate lip or ledge 9 is formed at the bottom of the slide bar 7 and upon the arcuate edge of this lip are projections or teeth 10 which are adapted to engage the side of the pole and thereby grip the same and clamp it against the anchoring ridge 6. A longitudinal series of transverse openings 11 is provided in the rib 8 of the slide bar and these openings are adapted to selectively aline with openings 12 in the flanges 3, a locking pin or key 13 being inserted through the alined openings, whereby to secure the slide in a set position relative to the main body or anchoring member.

The manner of using the device will, it is thought, be readily understood. The slide or clamping member is properly adjusted so that the distance between the vertical planes of the ridge 6 and the lip 9 will be substantially equal to the diameter of the pole to be set. By slightly canting the tool, it may be slipped over the end of the pole and brought to any desired point in the height of the same, whereupon, if the tool be swung to a position at right angles to the pole, as shown in Fig. 1, the pole may be securely engaged. The pole is then placed in an upright position at the point where it is to be set and the user applies pressure to the projecting portion of the tool by placing his foot thereon and exerting the weight of his body thereagainst, the result being that the tool tends to swing downward and thereby more firmly grip the pole and then drop to the ground, so that the pole will be forced downwardly into the earth. When the poles to be set are substantially uniform in diameter, it is obviously possible to set the tool so that its first adjustment will suffice for the entire period of its use, but if the poles vary considerably in diameter, it may be necessary to adjust the slide member for each pole, but, in either event, the operation is the same, and each pole will be very quickly set so that a large number of poles may be set in the same period of time which now enables a farmer or gardener to set only a very few poles. The device is exceedingly simple in construction and may be produced at very low cost, while it may be very easily set to properly engage a pole and will be found highly efficient in use.

Having thus described the invention, what I claim is:

1. A tool for the purpose set forth comprising a body constructed at one end with a hook adapted to partly encircle a pole or the like, a clamping member slidably mounted on the under side of the anchoring member and provided with an arcuate lip to engage the pole in opposition to the anchoring hook, and means for securing the clamping member in a set position upon the anchoring member.

2. A tool for the purpose set forth comprising an anchoring member having one end extended and projected laterally whereby to form an arcuate hook adapted to partly encircle a pole or the like, and a clamping member secured upon the under side of the anchoring member and adjustable longitudinally thereof and constructed at one end with a lip having a concave edge and provided with projections on said edge to engage the pole in opposition to the hook of the anchoring member.

3. A tool for the purpose set forth comprising a body having one end extended and projected laterally to form an arcuate hook adapted to partly encircle a pole or the like, the engaging surface of the hook being beveled from its sides toward its center whereby to form a pole-engaging ridge, the body having a longitudinal groove in its under side, and a clamping member slidably engaged in said groove whereby to be adjusted longitudinally of the body and provided at one end with a concave lip having projections thereon to engage the pole in opposition to the hook of the body, and a locking key inserted through the body and the clamping member whereby to secure the clamping member in a set position upon the body.

In testimony whereof I affix my signature.

ERNST MARQUART. [L. S.]